May 10, 1960

A. ROBERTS 2,936,436

FUNCTIONAL POTENTIOMETER

Filed Nov. 18, 1957

INVENTOR
ALBERT ROBERTS

BY *Samuel J Stone*

ATTORNEY

May 10, 1960 — A. ROBERTS — 2,936,436
FUNCTIONAL POTENTIOMETER
Filed Nov. 18, 1957 — 2 Sheets-Sheet 2
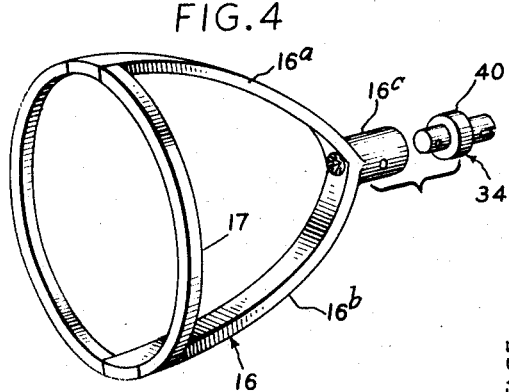
FIG.4
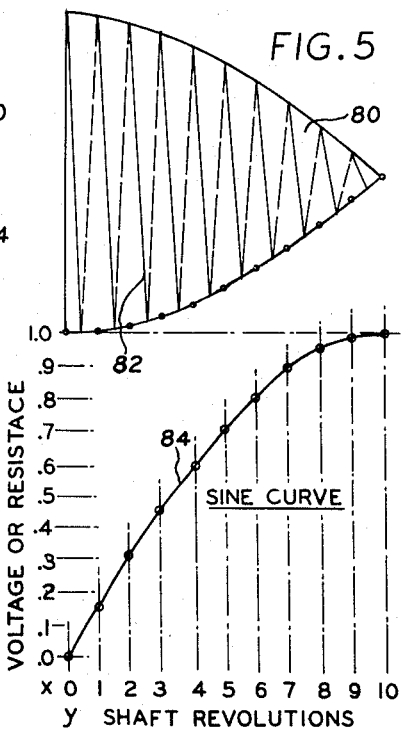
FIG.5 — SINE CURVE
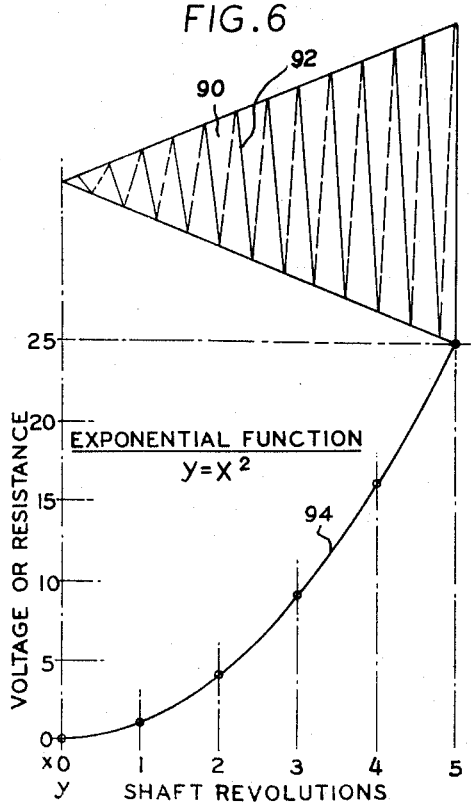
FIG.6 — EXPONENTIAL FUNCTION $y = x^2$
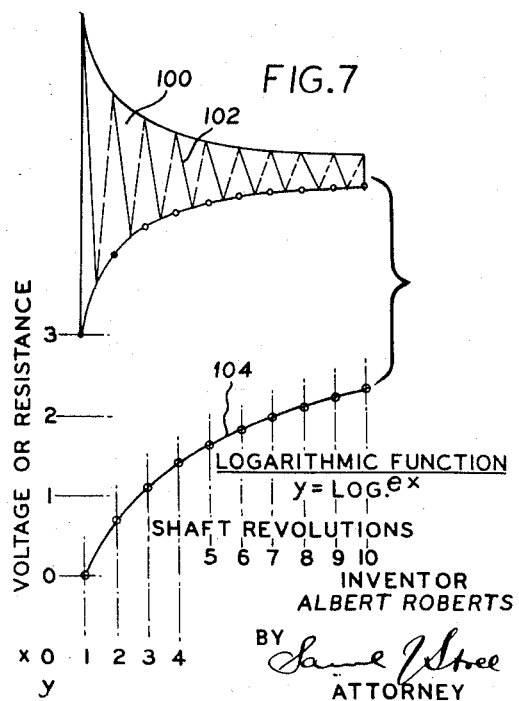
FIG.7 — LOGARITHMIC FUNCTION $y = \log_e x$
INVENTOR
ALBERT ROBERTS
BY
ATTORNEY United States Patent Office 2,936,436
Patented May 10, 1960

2,936,436
FUNCTIONAL POTENTIOMETER
Albert Roberts, Jamaica, N.Y.
Application November 18, 1957, Serial No. 697,241
3 Claims. (Cl. 338—141)

This invention relates to functional potentiometers.

The principal object of this invention is the provision of a potentiometer or rheostat whose voltage output or resistance variation is a non-linear function of input shaft rotation to an accuracy and resolution heretofore unattainable except in specially designed highly expensive apparatus.

The basic principle involves the provision of a multi-turn device having a stationary non-cylindrical core which is circular in cross-section at all points, with a resistance element wrapped around it in generally spiral fashion. A movable contact connected to the input shaft is made to travel a corresponding spiral path and thereby to follow the convolutions of the resistance element in continuous engagement therewith. This is in contradistinction to the sliding contact movement which is perpendicular to the resistance element convolutions encountered in functional potentiometers of the prior art.

Depending on the shape of the core, a voltage or resistance variation will be generated as a non-linear function of input shaft rotation. It is assumed that the several convolutions of the resistance element are uniformly spaced. It will be apparent that variations of the present procedure may be had by arranging the convolutions in non-uniform spaced relation to each other.

To illustrate, if the core is a right circular cylinder, and the convolutions of the resistance element are uniformly spaced to form a true helix, and the rotational movement of the input shaft is uniform, the voltage and resistance variation would theoretically be linear. I say "theoretically" because as a practical matter under conventional manufacturing conditions a helix would produce a deviation from a truly mathematical linear variation. The present method may be employed to compensate for multi-turn potentiometer resistance loading effects by slightly tapering the cylindrical core.

On the other hand, if a right circular cone is the shape of the core and a resistance element is wound spirally thereon, the spacing of the convolutions being uniform, the voltage or resistance will vary as some exponent power of the input shaft rotation.

The invention is illustrated in the accompanying drawing, in which:

Fig. 4 is a perspective exploded view of the slide support.

Fig. 5 is a schematic view of a resistance wound core of such tapered shape as would produce a sine curve, said view being combined with a graph connected therewith and showing said sine curve.

Fig. 6 is a schematic view showing a resistance wound core in the shape of a right circular cone and producing a curve having an exponential function as indicated in the graph connected therewith.

Fig. 7 is still another schematic view showing another tapered shape of resistance wound core producing a curve as shown in the accompanying graph having a logarithmic function.

Figure 1:
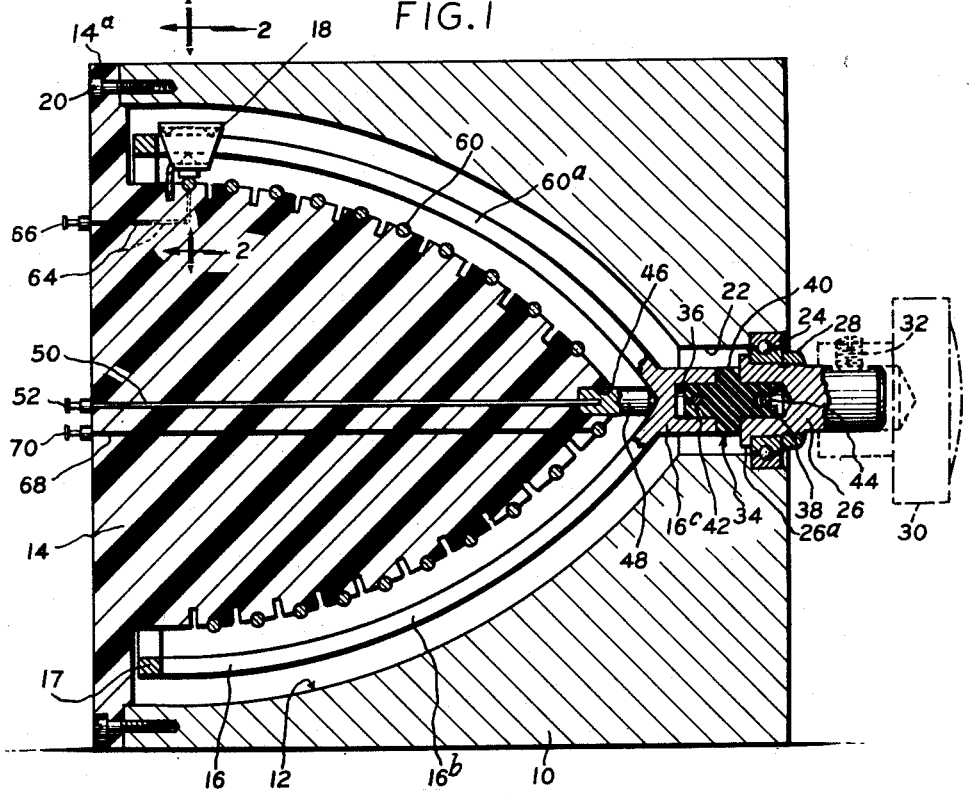
Fig. 1 is a longitudinal section through a complete potentiometer made in accordance with this invention.

Referring now to Figs. 1 to 4, inclusive, it will be observed that a housing 10 is provided which would normally occupy a stationary position. A generally conical recess 12 is formed therein to accommodate the core 14, the slide support 16 and the slide 18. Speaking generally, the shape of the recess will correspond in complementary fashion to the shape of the core, although this is not actually essential. It is sufficient if the recess will accommodate the core leaving sufficient room between the core and the recess wall to accommodate the slide and its support. It will be observed that an annular flange 14a is formed at the outer end of the core in concentric relation thereto, and that screws 20 secure said flange to the outer end of housing 10. It is by this means that the core is supported within recess 12 in spaced relation to the wall of said recess.

A bore 22 is formed in the opposite end of housing 10, centrally thereof, and coaxial with core 14. A bearing 24 is disposed within an annular rabbet formed in said bore 22, and said bearing is shown to support shaft 26 which is herein designated the input shaft. The bearing is seated against an annular shoulder 26a formed at the inner end of said shaft 26 and a threaded collar 28 on said shaft locks against the opposite side of the bearing, thereby securing the shaft to the bearing and permitting angular movement of the shaft about its own axis. In this connection it will be understood that the input shaft and the core are coaxial with each other.

A knob 30 is shown in phantom in Fig. 1 as being connected by means of a set screw 32 to the input shaft 26. This is purely illustrative of the many means that may be used to turn the shaft in order to operate the potentiometer. Both the shaft and the knob may be turned in either angular direction.

As Figs. 1 and 4 clearly show, the slide support 16 is a generally Y-shaped element having a pair of bowed arms 16a and 16b respectively, joined at their inner ends to a stem 16c. When only a single slide 18 is employed only one of said arms 16a, 16b is required, but both arms are preferred to provide balance and an open ring 17 may be provided to join the outer ends of said arms to reduce susceptibility to vibrations. The curvature of arms 16a and 16b in side view, as shown in Fig. 1, corresponds to the curvature of the core 14 in longitudinal section. Stated differently, arms 16a and 16b parallel the surface of the core in a plane common to both arms.

It will be understood that supporting member 16 is made of electrically conductive material such as brass or silver-plated copper or the like. It is necessary to insulate said supporting member from housing 10 and shaft 26, and this is done by providing a dielectric stud shaft 34 between stem 16c and shaft 26. A central hole 36 is formed in stem 16c, axially thereof, and a corresponding hole 38 is formed in shaft 26, axially of said shaft. The two holes 36 and 38 may be aligned as shown in Fig. 1 by means of stud shaft 34, one end of which enters hole 36 and the opposite end of which enters hole 38. An annular shoulder 40 is provided on the stud shaft between shaft 26 and stem 16c to space and insulate them from each other. Suitable pins 42 and 44 respectively secure said stud shaft 34 to stem 16c and shaft 26.

An axial hole 46 is formed in core 14 at its inner end and mounted in said hole is a pin 48 which serves two purposes: in the first place, it engages stem 16c of supporting member 16 between the two arms 16a and 16b, and in the second place it serves as a conductor. In the first instance it constitutes a bearing which centers and helps support the supporting member 16. In the second instance it serves as a brush by which current is conducted between said supporting member 16 and a conductor 50, which extends through core 14 and is connected at its inner end to said pin 48 and at its outer end to a terminal or binding post 52. It will be understood at this point that core 14 is made of dielectric material, such as molded plastics, while housing 10 may be made of any suitable material, whether conductive or not. As shown in the drawing, housing 10 is a metal casting.

Slide 18 is simply a sleeve slidably mounted on arm 16a, although it may equally as well be mounted on arm 16b and indeed, in a special application, it is conceivable that two such slides may be utilized, one on each said arm. Taking the case shown in the drawing, it will be observed that slide 18 is provided with a pair of upper bearing portions 18a and 18b respectively and a lower bearing portion 18c. These three bearing portions support the slide on arm 16a of supporting member 16.

Figure 2:
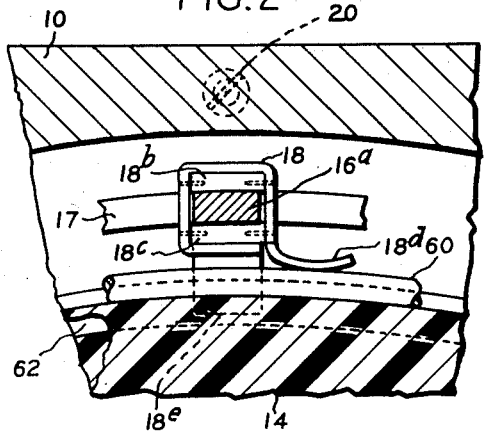
Fig. 2 is an enlarged fragmentary transverse section of the line 2—2 of Fig. 1, showing the contact member or slide.
Figure 3:
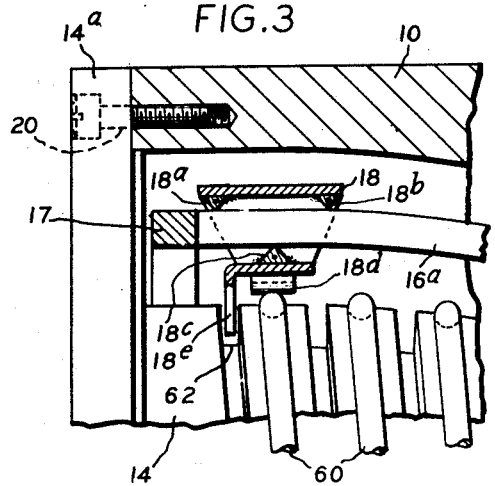
Fig. 3 is another fragmentary view, partly in section, showing how the slide is mounted on its supporting member and how it engages the core and the resistance element on the core.

A wiping element 18d extends downwardly and laterally from slide 18 and it will be observed particularly in Figs. 2 and 3 that said wiping element contacts the resistance element 60. Also projecting downwardly from slide 18 is a detent 18e and it will be observed in Fig. 3 that said detent projects into a groove 62 formed in the core.

As has above been indicated, resistance element 60 is spirally wound on core 14, and this is done, preferably, in a spiral groove formed in the core for that purpose. Groove 62 is a continuous groove spirally formed between the convolutions of the resistance element 60.

In the operation of this device, knob 30 is turned so as to cause shaft 26, stud shaft 34 and supporting element 16 to rotate about a common axis. Slide 18 is thereby also caused to pursue a circular path about the same axis, but since its detent 18e engages spiral groove 62, the circular path of movement of said slide actually becomes a spiral path, thereby keeping the wiping element 18d in continuous contact with the spiral resistance element 60. A circuit with a progressively varying resistance is thereby provided, in which the component elements include the following: terminal 52, conductor 50, brush 48, supporting element 16, slide 18 including wiper 18a, resistance element 60, and another conductor 64 which is connected at one end to said resistance element and at its opposite end to a terminal 66. If desired, the circuit would exclude conductor 64 and instead include another conductor 68 which is connected at one end to the opposite end of the resistance element 60 and which is connected at its opposite end to a terminal 70 or the circuit may include both conductors. In short, conductor 64 is connected to that end of the spiral resistance element where the convolutions are largest, while conductor 68 is connected to the opposite end where the convolutions are smallest. Generally speaking, all three conductors 50, 64 and 68 may be used simultaneously when measuring voltage.

Turning now to Fig. 5 it will be seen that core 80 has the same general shape or configuration as that of core 14 above mentioned. This is a generally conical shape with a convexly curved surface in longitudinal section. A spirally wound resistance element 82 on said core 80, with its convolutions equally spaced and the input shaft which is connected to the slide contact rotating at a constant speed, will produce an output voltage or resistance corresponding to the sine curve 84 shown therein.

Fig. 6 shows a core 90 of conical shape and spirally wound thereon is a resistance element 92. Assuming the convolutions to be uniformly spaced, and a constant rotational speed of the shaft, the output voltage or resistance would vary in accordance with exponential function curve 94.

Referring now to Fig. 7 it will be seen that a core 100 is provided in generally conical form, but having a concavely curved surface in longitudinal section. A resistance element 102 is spirally wound on said core and once again it is assumed for the purposes of the appended graph that the convolutions are equally spaced and the speed of rotation of the input shaft is constant. The result is a voltage or resistance which varies in accordance with the logarithmic function curve 104 shown in the drawing.

For the purposes of the claims, these various shapes in which the core may be made will be termed conical or generally conical. In this sense, it is immaterial whether a true cone is intended, as shown in Fig. 6, or a generally conical shape with a convexly curved surface as shown in Fig. 5, or a generally conical shape with a concavely curved surface as shown in Fig. 7. It will also be understood that combinations of these shapes and curves may also be provided within the basic principles of this invention. For example, two truncated cones may be placed coaxially either with their smaller ends abutting or their larger ends abutting to form a core suitable for the purposes of this invention. Of course, a different graph curve will be formed in each case.

The foregoing is illustrative of preferred forms of this invention, and it will be understood that other forms and modifications of these forms may be had within the broad spirit of the invention and the broad scope of the claims.

I claim:

1. A potentiometer whose voltage output or resistance variation is a non-linear function of input shaft rotation, comprising a fixed, generally conical dielectric core having a curved face when viewed in longitudinal section, a resistance element spirally wound on said core, and an electrically conductive slide contacting said resistance element, said slide being movable in a spiral path corresponding to the spiral of the resistance element for continuous contact therewith, said generally conical core being supported in a stationary position, an electrically conductive, smooth surfaced, slide-supporting member rotatably mounted for movement of revolution about the axis of said core, said slide being mounted on said supporting member in electrical contact with and for slidable movement thereon longitudinally thereof, while at the same time being carried by said supporting member around the core, and a spiral groove provided on the core, the convolutions of said spiral groove alternating with the convolutions of said resistance element, said slide being provided with a detent which engages said spiral groove to guide the slide in a spiral path corresponding to the spiral of the resistance element.

2. A potentiometer in accordance with claim 1, wherein the generally conical core has a convexly curved face when viewed in longitudinal section.

3. A potentiometer in accordance with claim 1, wherein the generally conical core has a concavely curved face when viewed in longitudinal section.

References Cited in the file of this patent

UNITED STATES PATENTS

| 2,405,890 | Kunz | Aug. 13, 1946 |
| 2,778,909 | MacLaren | Jan. 22, 1957 |
| 2,796,502 | Engelder | June 18, 1957 |